United States Patent Office 3,144,493
Patented Aug. 11, 1964

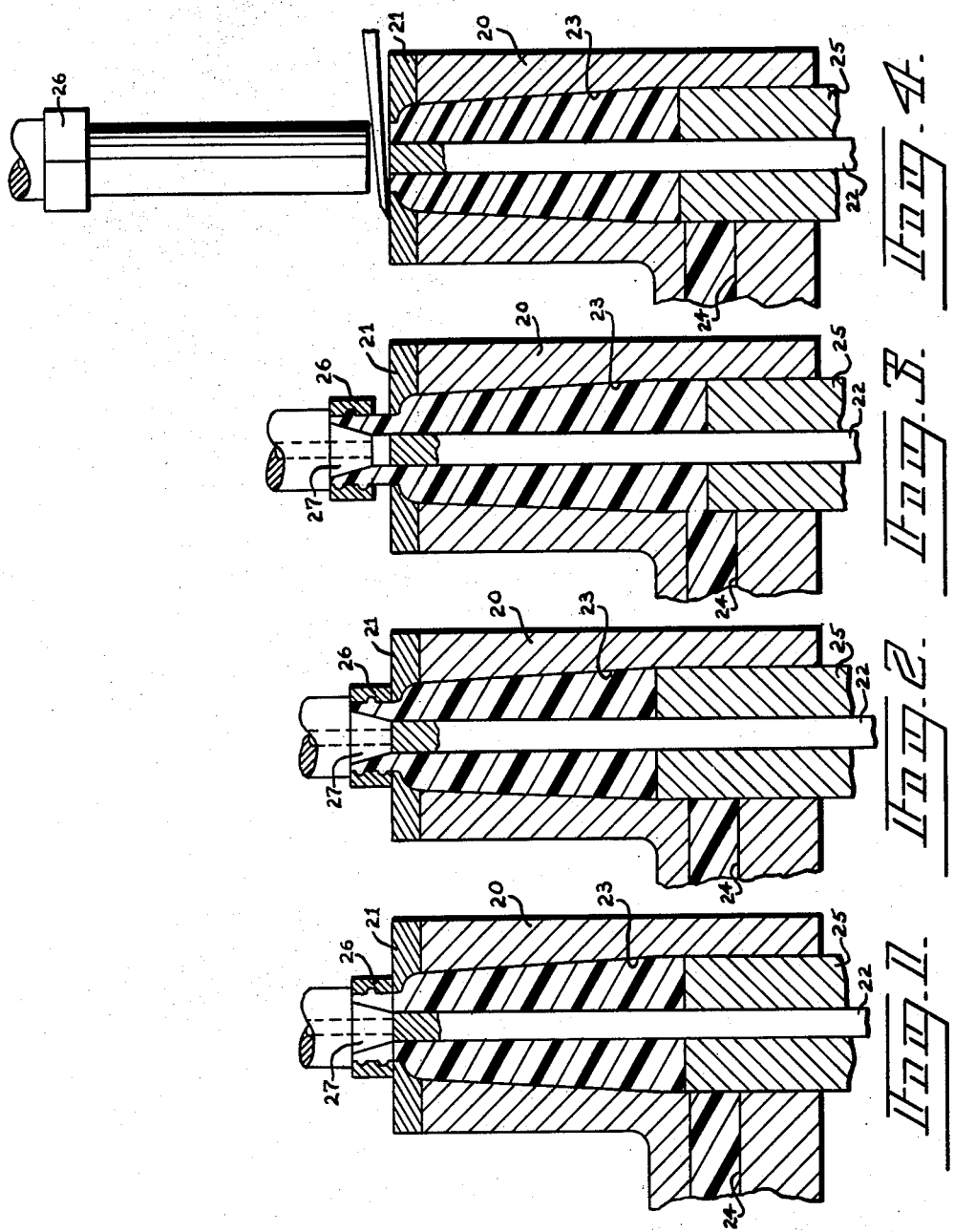

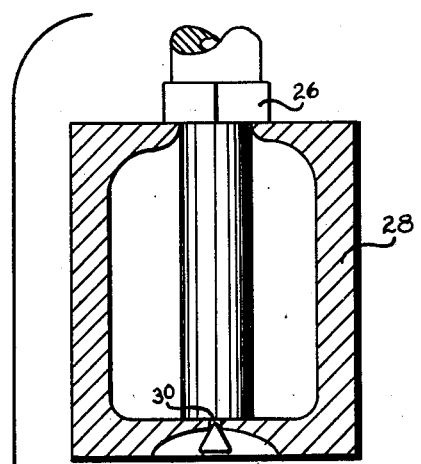
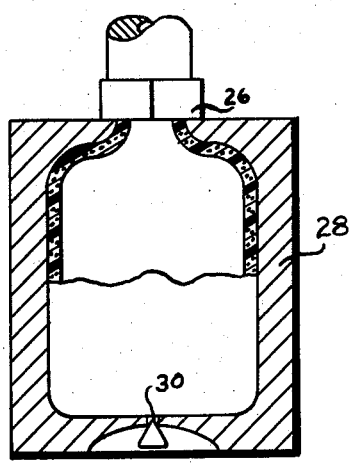
Fig. 6.
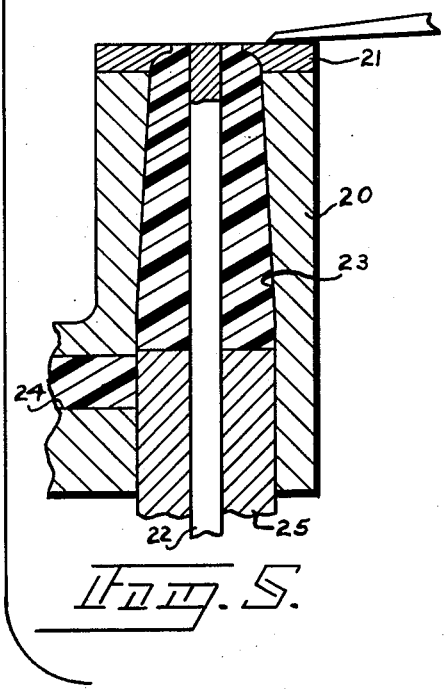
Fig. 5.
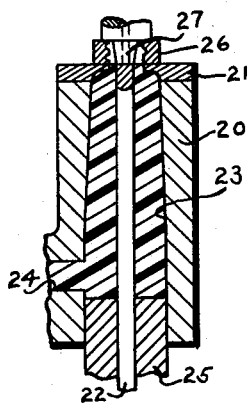
Fig. 5A.
INVENTOR.
THOMAS R. SANTELLI
BY W.A. Schaich &
Charles S. Lynch
ATTORNEY

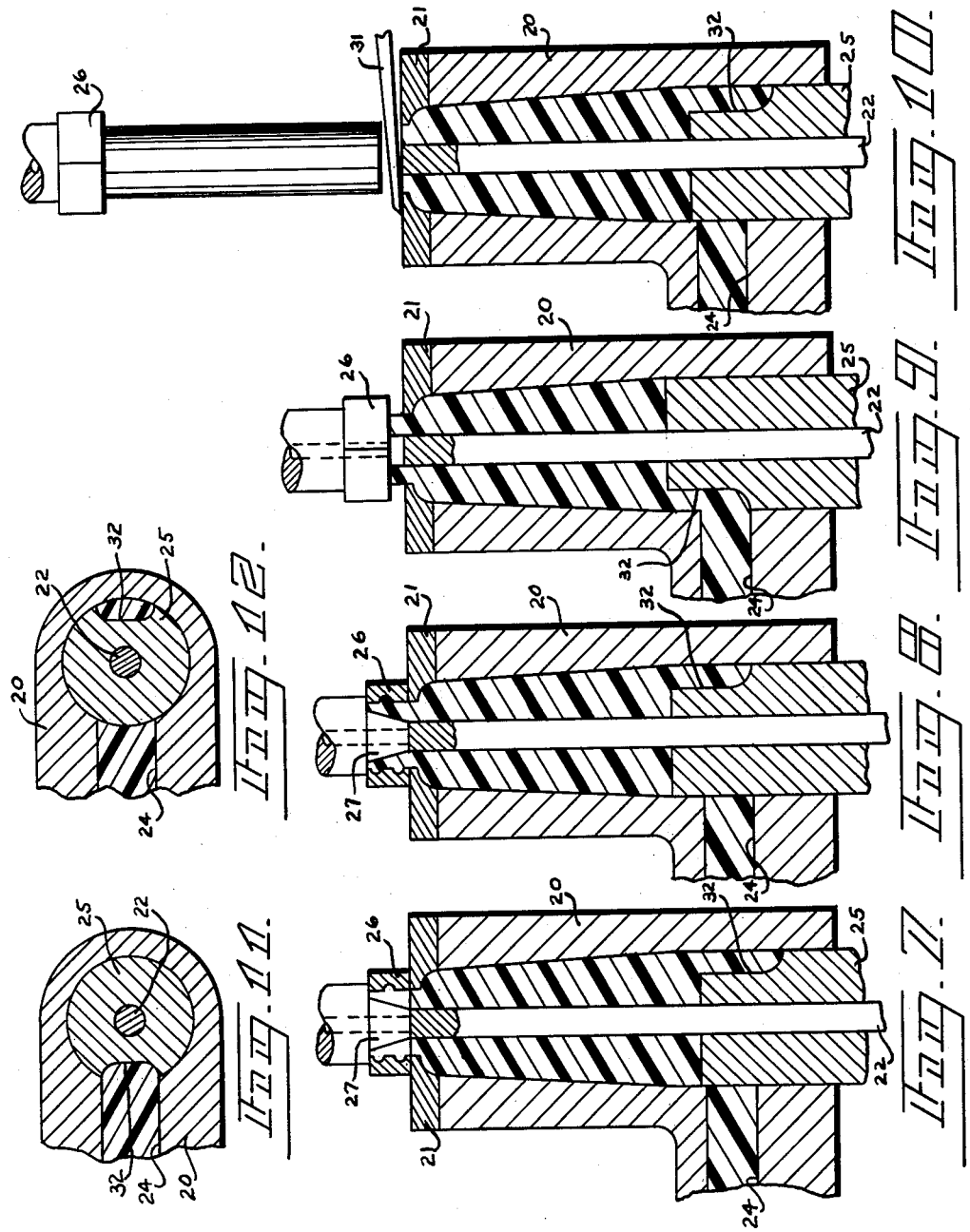

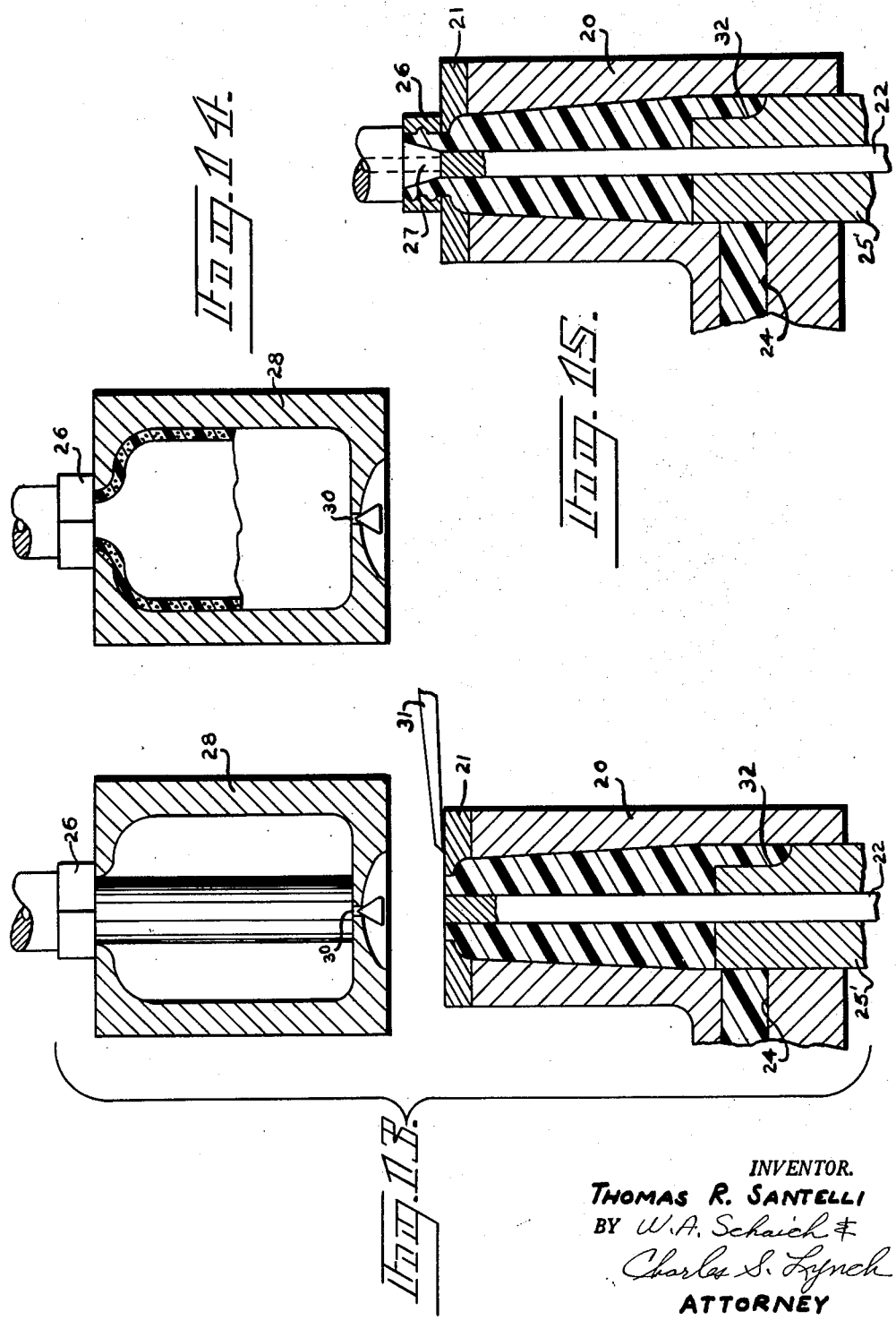

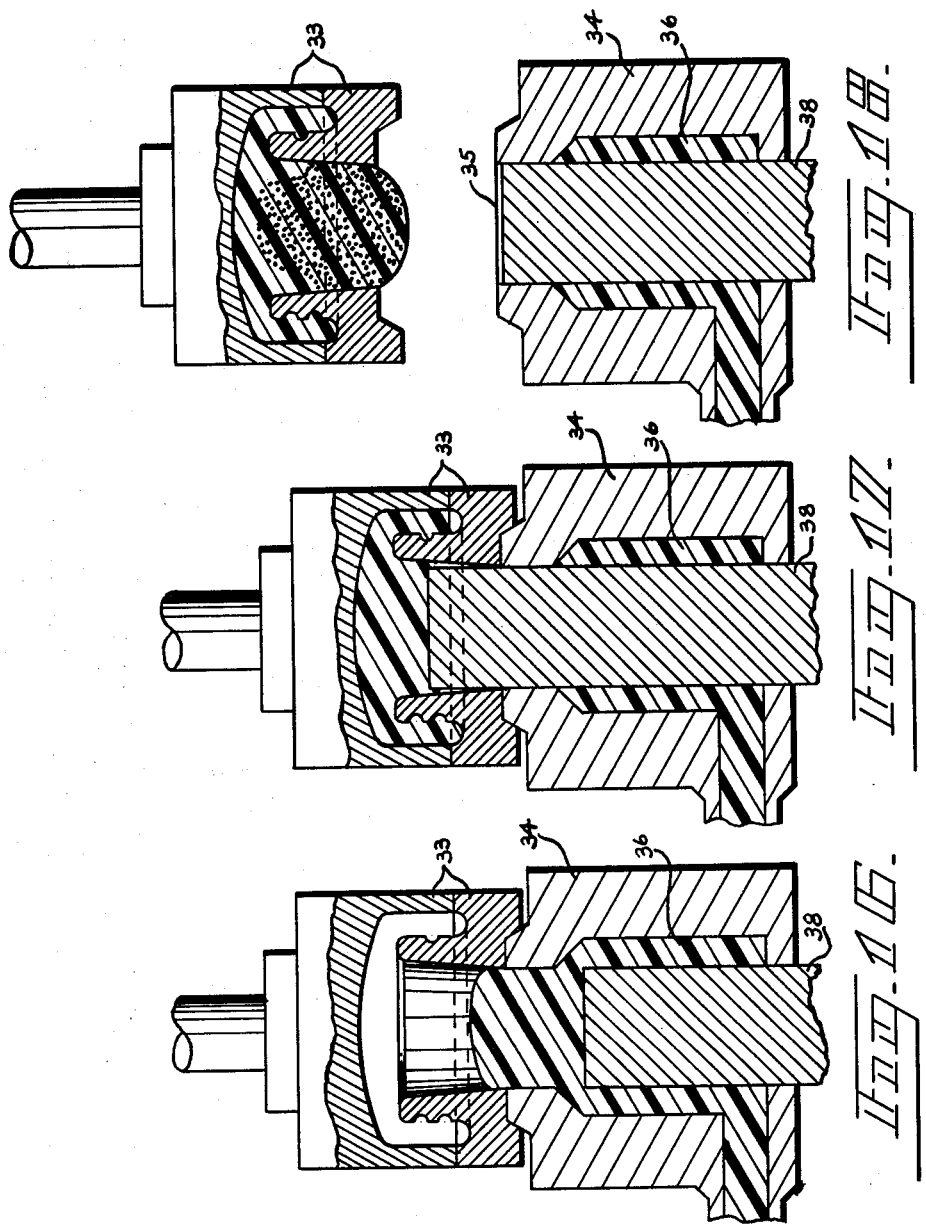

3,144,493
METHOD OF FORMING PARTLY FOAMED
PLASTIC ARTICLES
Thomas R. Santelli, Toledo, Ohio, assignor to Owens-Illinois Glass Company, a corporation of Ohio
Filed Oct. 19, 1959, Ser. No. 847,144
3 Claims. (Cl. 264—51)

This invention relates to plastic articles having an end portion in substantially unexpanded or unfoamed condition with the balance of the article being integral therewith and in expanded or foamed condition. In another aspect the invention relates to a method for forming such an article.

Various articles made of foamed or cellular plastics are desirable because of the various unique properties of foamed plastics, such as cushioning and insulating effects or because of the savings in material which can be realized when producing the article from a plastic in cellular form. However, it has not been desirable to form many objects from cellular plastics in the past because some objects require greater strength or rigidity in certain areas or portions than can be offered by the particular cellular plastic in question.

It is, therefore, an object of the invention to provide a method of forming a cellular plastic article having an end portion which is in a substantially unexpanded condition and integral with the cellular portion of the plastic article.

It is another object of the invention to provide a method for producing such an article.

Other objects and advantages of the invention will become apparent from a consideration of the accompanying disclosure and the drawings.

Accoring to the invention there is provided a method which comprises providing a quantity of hot plasticized plastic material containing an intimately dispersed foaming or cellulating agent, forming a substantially unexpanded, non-cellular shaped end portion of an article from a portion of said plastic material under shaping conditions which prevent any substantial foaming of said portion by said foaming agent, from another portion of said quantity of plastic material forming the balance of said article integral with said shaped end portion under conditions whereby said second portion of said article is expanded into a cellular structure by the action of said foaming agent.

Further according to the invention there is provided a method for forming a plastic article having a cellular portion integral with an end portion formed from the same plastic composition as said cellular portion, said end portion being in a substantially solid or unexpanded, non-cellular-condition.

Blowing or foaming agents which are dispersed in plastics are of two main general types. In the first type the blowing agent is a chemical blowing agent, that is, one which evolves a gas under the influence of heat by chemical reaction or chemical decomposition. The second type of blowing agent is a physical blowing agent, such as a volatile liquid dispersed in the plastic, such liquid forming a gas or vapor under the influence of elevated temperatures and/or lowered pressures. Such foaming agents are well known and will not be discussed in detail here. Either type of blowing agent is applicable in the present invention.

Chemical foaming agents are usually employed at a concentration of from about 0.5 to 10 weight percent of the plastic composition, including the foaming agent, although higher or lower amounts are applicable.

The nature of the invention will be better understood from a description of the drawings which illustrate several suitable types of apparatus for carrying out the method and producing the article of the invention.

Referring to the accompanying drawings:

FIGS. 1 through 6 inclusive are sectional elevational views of one suitable apparatus for performing the method, showing the parts in different positions corresponding to various steps of the method;

FIGS 7 through 10 and 13, 14 and 15 inclusive are sectional elevational views of another apparatus for performing the method, showing the parts in different positions corresponding to the various steps in the method;

FIG. 11 is sectional view at the line 11—11 of FIG. 9;

FIG. 12 is a sectional view at the line 12—12 of FIG. 7; and

FIGS. 16, 17 and 18 illustrate sectional views of another apparatus suitable for effecting the method of the invention showing the parts in different positions.

As shown in FIGS. 1 through 6, an apparatus for performing the method includes a body 20 having a vertical opening therethrough and an orifice ring 21 overlying the vertical opening. A mandrel 22 is positioned in the opening thereby forming a tubular cavity 23. The tubular cavity 23 is in communication with the outlet of a plasticizer and extruder (not shown) through a channel 24.

A sleeve 25 surrounds the mandrel 22 and is reciprocable by means (not shown) from a position above and overlying the channel 24 to a lower position whereby the tubular cavity 23 can be brought into and out of communication with the channel 24.

A partible neck mold 26 and a hollow core 27 are mounted above the body 20 for axial movement into and out of alignment with the open end of the cavity 23. A partible finishing mold 28 (FIGS. 5 and 6) is provided for expanding the plastic tube to finished form, as hereinafter described. The bottom of the mold sections are beveled at 29 and spaced apart at 30 in order to pinch the plastic material and seal the end thereof.

At the beginning of the operation of the apparatus shown in FIGS. 1 through 6, a quantity of hot plastic containing foaming agent material and sufficient to fill the tubular cavity is introduced from the source of plastic through the channel 24 to the cavity. The mass of plastic material in the tubular cavity is isolated from the parent mass of plastic material by movement of the sleeve 25 upwardly across the channel 24. The apparatus if then in position for the beginning of the cycle and the neck mold 26 is brought into contact with the body 20, the core 27 contacting the mandrel 22 (FIG. 1).

The sleeve 25 is then moved upwardly under controlled pressure a sufficient distance to force a portion of the plastic material in the tubular cavity upwardly in order to fill the neck mold 26 and form the finish or end portion of the article (FIG. 2). The sleeve 25 is then retracted downwardly to reestablish communication with the plastic material (FIG. 3). Simultaneously the neck mold is moved upwardly and axially away from the end of the cavity. The pressure of plastic material from the parent mass forces plastic material into the tubular cavity, and prevents any substantial expansion by foaming of the plastic in the neck mold. Also, the mold chills the plastic sufficiently that expansion is avoided when the neck mold is later removed. A portion of the plastic material in the cavity 23 is displaced out of the open end of the cavity, thereby forming a length of tubing integral with the neck. As this tubing is formed the foaming agent therein causes expansion into a tube of foamed or cellular plastic as it issues from the cavity. As the desired length of tubing is formed, the sleeve is again moved upwardly to cut off or resegregate the parent mass from the plastic material in the tubular cavity. A shear blade 31 is then moved across the orifice to sever the length of tubing from the plastic material in the tubular cavity (FIG. 4).

The sections of the hollow mold 28 may then be closed about the plastic material, thereby pinching the lower end of the tubing. The foamed tubing can then be expanded to the confines of the mold by applying fluid under pressure through the hollow core 27 (FIGS. 5 and 6).

After the tubing has been severed from the plastic material in the cavity (FIG. 4), the apparatus is again in position for beginning the cycle by bringing a neck mold into contact with the body 20 and forming the neck finish by moving the sleeve 25 upwardly.

A modification of the method can be performed by retracting the sleeve 25 at the beginning of the cycle as shown in FIG. 5a to permit a limited quantity of plastic to enter the tubular cavity and then moving the sleeve upwardly, simultaneously isolating the quantity of plastic in the tubular cavity and forcing plastic into the neck mold positioned over the cavity as shown by FIGS. 2 and 8. The sleeve is then retracted and the neck mold moved axially away from the cavity to form a length of tubing integral with the neck, in the same manner as heretofore described. As the desired length of tubing is formed the sleeve is again moved upwardly as in FIG. 4, or rotated as in FIG. 10 to isolate or resegregate the plastic material in the cavity and the length of tubing is severed. The cycle of operations can then again be started by the retraction of the sleeve.

Another apparatus for performing the method is shown in FIGS. 7 through 15, inclusive. In this apparatus the sleeve 25' is provided with a slot or groove 32 extending longitudinally along the outer surface of the sleeve to the upper end thereof. In the operation of this apparatus the tubular cavity is initially filled with plastic material containing foaming agent as in the form of the apparatus shown in FIGS. 1 through 6. The sleeve 25' is in the position shown in FIG. 7 wherein the plastic material in the tubular cavity is isolated or segregated from communication with the parent mass and the groove 32 is in a position out of communication with the channel 24 (FIG. 12). The sleeve 25' is then moved upwardly to force plastic material into the neck mold, thereby forming the neck finish (FIG. 8). The sleeve is then rotated to bring the groove 32 into communication with the channel 24, thereby permitting plastic material to flow from the parent mass to the tubular cavity (FIGS. 9, 11). Simultaneously with this action, the neck mold is moved axially away from the cavity, thereby forming a length of tubing integral with the neck finish by the flow of plastic material out of the tubular cavity. During the forming of the tubing the sleeve is retracted into its lower position. As the desired length of tubing is formed, the sleeve is again rotated to bring the groove 32 out of register with the channel 24 isolating or resegregating the plastic material in the cavity from the parent mass (FIG. 10).

The neck finish and integral tubing can then be severed (FIG. 10) and sealed and expanded, as shown in FIGS. 13 and 14, by closing the mold sections and supplying fluid under pressure through the core.

At the severing of the tube from the material in the tubular cavity, the various parts are again in position for application of pressure to the mass of plastic in the tubular cavity to force plastic out of the tubular cavity and once again begin the cycle of forming a hollow plastic container.

In FIGS. 16, 17 and 18 there is illustrated another method for making a somewhat different article according to the invention. This specific article illustrated is a solid, substantially unfoamed bottle cap having a central plug portion in foamed condition. The illustrated apparatus includes a body 34 having a vertical opening therethrough and an orifice 35 overlying the vertical opening. The vertical opening 36 is in communication with the outlet of a plasticizer and extruder (not shown) through a channel 37. A plunger 38 is positioned in opening 36 and is reciprocable by means (not shown) from a position well above opening 35, such as the position shown in FIG. 17 to a lower position, such as shown in FIG. 16, whereby the opening 36 can be brought in and out of communication with orifice 35.

A partible mold 33 is mounted above the body 34 for axial movement into and out of alignment with the orifice 35.

At the beginning of the operation of the apparatus shown in FIGS. 16 through 18, the respective parts of the apparatus are as shown in FIG. 18, except that the mold 33 contains no plastic. A quantity of plastic containing foaming agent has already been introduced into opening 36 through the channel 37 as shown in FIG. 18. The mold is moved into alignment with orifice 35 so as to close the apparatus and the plunger 38 is reciprocated downwardly to a position shown in FIG. 16, allowing a measured quantity of hot plastic to move into the opening as shown in FIG. 16. The plunger is moved to a position shown in FIG. 17, thus ramming the plastic into the mold. The plunger 38 is held in that position for a short period. Then mold 33 is again moved upwardly to the position shown in FIG. 18, allowing the central portion of the plastic containing a foaming agent to expand downwardly through the channel of the mold to form a foamed core. The plunger 38 is moved to the position shown in FIG. 18 ready for the next cycle. After the molded part has sufficiently hardened the mold 33 is parted and the molded article removed therefrom.

In the foregoing operation the relatively thin sections of the bottle cap illustrated as being made of solid plastic are cooled sufficiently by the mold 33 while under the pressure of the ram in the position shown in FIG. 17 that the plastic is hardened and the foaming agent in that portion of the plastic is not effective to cause any substantial expansion of the plastic, thus causing this portion of the molded piece to be in a solid, substantially unfoamed, unexpanded condition. Indirect cooling means can be provided in the mold around this portion of the molded article, if desired, to assist in the cooling. The central portion of the plastic in the mold, as shown in FIG. 17, does not become sufficiently cooled during the injection molding step to set up or harden, and when the mold is separated from the plunger and the opening 35, the still hot, plasticized plastic containing foaming agent foams under the influence of the foaming agent, thus forming the cellular plug structure illustrated.

The following examples illustrate the methods and articles made from various thermoplastics, but the examples are illustrative only and are not to be taken as limiting the invention.

*Example 1*

Low density polyethylene in particle form containing p,p'-oxybis (benzenesulfonyl hydrazide) as a foaming agent was introduced into a molding machine of the type of FIGURES 1 to 6 where it was heated and plasticized to a workable condition. This foaming agent has a decomposition range of about 150 to 160° C. Bottles were molded using the machine as described in the description of FIGS. 1–6. The temperature in channel 24 and tubular cavity 23 was maintained at about 305° F. The pressure during the step shown in FIG. 2 was theoretically about 1800 p.s.i.g., although actual pressure may have been somewhat less due to friction losses. A bottle was molded in the manner described with respect to FIGURES 1–6, and the resulting bottle had a cellular foamed structure while the neck or finish was substantially solid and unexpanded.

In the cycle of operations the time of the total cycle was 31 seconds, while the time from the beginning of the cycle shown in FIG. 1 to the time the sleeve 25 reached the position shown in FIG. 3 was 2.6 seconds. Sixty bottles were molded in this manner.

Example II

The procedure described in Example I was repeated, but using a high density linear polyethylene having a density of about 0.96 gms./cm. and a melting point of about 260° F. This polyethylene contained 1 percent by weight 1,1'-azobis (formamide) as the foaming agent. The temperature in the channel 24 and the cavity 23 was maintained at about 315° F. The bottle again had a substantially solid unexpanded neck or finish portion integral with a cellular body portion.

Example III

The procedure of Example I was again repeated but using particulate polystyrene containing pentane intimately dispersed therein as a foaming agent.

The temperature in the channel 24 and the cavity 23 was maintained at about 325° F.

The bottle so produced had a substantially solid, unexpanded neck or finish integral with a foamed body portion of very fine-celled foamed structure.

In the embodiment of the method described with respect to FIGURES 1–6 and with respect to FIGURES 7–15, the step of blowing the air as in FIGURES 5 and 6 and FIGURES 13 and 14 can be omitted where the dimensions of the foamed body of the article are not desired to be greater than produced by the step shown in FIGURE 4 or FIGURE 10. The tubular foamed extruded body is merely cooled in place, and can be pinched together at the end, and severed, and removed from the apparatus as a finished article.

The invention has been described as being applied to organic plastic materials. The terms plastic and thermoplastic, as used herein, define any organic material which has the required condition of plasticity to permit expansion and setting in predetermined form.

The terms tubular and tubing, as used herein, are intended to include any hollow shapes in which plastic material can be formed including non-circular and irregular shapes.

As will be evident to those skilled in the art, various modifications of this invention can be made or followed in the light of the foregoing disclosure and discussion without departing from the spirit or scope of the disclosure or from the scope of the claims.

I claim:

1. A method which comprises the steps of (1) providing a single, undivided quantity of hot plasticized plastic material containing an intimately dispersed foaming or cellulating agent, (2) forming a substantially unexpanded, non-cellular shaped end portion of an article from a first portion of said undivided quantity of plastic material under temperature and pressure shaping conditions which prevent any substantial foaming of said end portion by said foaming agent and chilling said end portion to an unplasticized essentially rigid condition preventing foaming even at a lower pressure, (3) from a second portion of said undivided quantity of plastic material forming the balance of said article integral with said shaped end portion at a lower pressure condition and a temperature condition wherein said second portion is still plasticized, whereby said second portion of said article is expanded into a cellular structure by the action of said foaming agent, said single quantity of plastic material remaining undivided and unseparated throughout said method.

2. A method of forming a shaped plastic article having a cellular plastic body portion integral with a substantially unexpanded, non-cellular end portion, said method comprising the steps of (1) providing a single, undivided quantity of hot plasticized plastic material containing a foaming or cellulating agent, (2) moving a first portion of said undivided quantity of plastic material into defined portions of a shaping mold under temperature and pressure conditions preventing any substantial expansion of said first portion by said foaming agent and thereby forming said end portion and chilling said end portion to an unplasticized essentially rigid condition preventing foaming even at a lower pressure, (3) shaping a second portion of said undivided quantity of plastic material integral with said first portion at a lower pressure condition and a temperature condition wherein said second portion is still plasticized, whereby said second portion becomes expanded to a cellular form during said shaping, thereby forming said body portion, said single quantity of plastic material remaining undivided and unseparated throughout said method.

3. A method of forming a shaped plastic article having a cellular plastic body portion integral with a substantially unexpanded, non-cellular end portion, said method comprising the steps of (1) providing a single, undivided quantity of hot plasticized plastic material containing a foaming or cellulating agent, (2) moving a first portion of said undivided quantity of plastic material into defined portions of a shaping mold under temperature and pressure conditions preventing any substantial expansion of said first portion by said foaming agent and chilling said end portion to an unplasticized essentially rigid condition preventing foaming even at a lower pressure, (3) extruding a second portion of said undivided quantity of plastic material integral with said first portion at a lower pressure condition and a temperature condition wherein said second portion is still plasticized, whereby said second portion becomes expanded to a cellular form during said extruding, thereby forming said body portion, said single quantity of plastic material remaining undivided and unseparated throughout said method.

References Cited in the file of this patent

UNITED STATES PATENTS

| | | |
|---|---|---|
| 2,023,905 | Schwab | Dec. 10, 1935 |
| 2,035,404 | Quinn | Mar. 24, 1936 |
| 2,150,287 | Minor | Mar. 14, 1939 |
| 2,319,042 | De Wyk | May 11, 1943 |
| 2,716,778 | Beare | Sept. 6, 1955 |
| 2,767,436 | Noland et al. | Oct. 23, 1956 |
| 2,898,632 | Irwin et al. | Aug. 11, 1959 |
| 2,898,634 | Alderfer | Aug. 11, 1959 |
| 2,908,943 | Miller | Oct. 20, 1959 |
| 2,950,505 | Frank | Aug. 30, 1960 |
| 2,964,799 | Roggi et al. | Dec. 20, 1960 |